Oct. 21, 1958 C. B. JOLLIFFE 2,857,455

SUBSCRIPTION COLOR TELEVISION SYSTEM

Filed Dec. 1, 1953 3 Sheets-Sheet 1

INVENTOR.
Charles B. Jolliffe
BY [signature]
ATTORNEY

INVENTOR.
Charles B. Jolliffe
BY [signature]
ATTORNEY

Oct. 21, 1958 C. B. JOLLIFFE 2,857,455

SUBSCRIPTION COLOR TELEVISION SYSTEM

Filed Dec. 1, 1953 3 Sheets-Sheet 3

INVENTOR.
Charles B. Jolliffe
BY [signature]
ATTORNEY

United States Patent Office 2,857,455

Patented Oct. 21, 1958

2,857,455

SUBSCRIPTION COLOR TELEVISION SYSTEM

Charles B. Jolliffe, Princeton, N. J., assignor to Radio Corporation of America, a corporation of Delaware Application December 1, 1953, Serial No. 395,446

15 Claims. (Cl. 178—5.1)

The present invention relates to improvements in television systems particularly of the secrecy type in which the television transmission is encoded or otherwise garbled such that it can be successfully reproduced only by specialized television receiving equipment.

In more particularity, although not necessarily exclusively, the present invention relates to an improved technique and apparatus for use in subscriber television systems in which a coded television image representing a mutilated and useless television scene is caused to be displayed. A high quality television image can only be reproduced by television receivers having decoding or descrambling equipment coordinated with the mode of coding or descrambling employed at the transmitter.

More directly, the novel features of the present invention find ready application to the successful mutilating, scrambling or barbling of color television signals particularly of the type as described in the "RCA Review" for June 1953, vol. 14, No. 2, pages 144 through 226.

There is known in the art of subscriber television signal transmission and reception numerous schemes for rendering a transmitted television signal useless to those owners of television receivers not subscribing to special services which alter the operation of their television receiver in a manner complementary to the mode of television signal scrambling. Heretofore, one of the more popular methods of television signal scrambling has been to cause the timing between the horizontal synchronizing signal information and the video signal information to vary in accordance with a random or selected schedule or pattern. Such signal garbling may result in the horizontal jitter of the received television signal on unmodified standard television receivers. In copending United States patent application by Marshall C. Kidd et al., entitled "Television Systems," Serial No. 380,222, filed September 15, 1953, there is described novel means for producing the variation in timing between the video signal information and the horizontal synchronizing signals as ultimately broadcast by means of conditionally interposing a signal delay means in the video signal channel of radio transmitting and receiving equipment without in any way affecting the horizontal synchronizing signal or circuits responsive thereto. The Kidd et al., patent application further describes the application of signal delay techniques to color television systems whereby to garble not only the brightness or luminosity information of the broadcast signal but also the color information accompanying the broadcast brightness signal.

As described in the above-identified "RCA Review" article, the instantaneous phase relation of the color subcarrier signal, as compared with a signal of like frequency and fixed phase, defines the color or hue of the color information being transmitted at any given instant. In accordance with the present invention, the phase of the color subcarrier signal information (sometimes referred to as color carrier information) at the transmitter is caused to vary or shift in accordance with a coding signal. The variation or shift in phase may be made effective only as to the subcarrier signal applied to one or more of the color subcarrier modulator circuits and/or the shift in phase may be applied to the transmitted color synchronizing signal, generally referred to as the "burst." As a result of adequate coded shifting of the color subcarrier information, the resultant transmitted signal will produce an intolerable garble of color as received by standard color receivers. Recovery of the color television signal may, however, be accomplished by communicating a version of the coding signal to the receiving location and imposing complementary phase shifting to the color subcarrier information within the receiving apparatus or to the normally fixed phase signal used for demodulation of the modulated subcarrier. By imposing random signal delay to the brightness or luminosity channel in accordance with the Kidd et al., application supra, the resultant color television signal will not only be garbled as received by standard color receiving circuits but also when received by standard monochrome receiving apparatus.

It is, therefore, an object of the present invention to provide an improved subscription television system.

It is also an object of the present invention to provide an improved subscription television system applicable to a color television system.

It is further an object of the present invention to provide an improved subscription color television system in which both color information and brightness information are varied in accordance with a predetermined schedule.

It is another object of the present invention to provide an improved subscription television system in which an otherwise fully compatible color television signal may be rendered useless to both standard color and monochrome receivers unless a decoding service is employed on a subscription basis.

A more complete understanding of the present invention, as well as other objects and features of advantage thereof, will be gathered from the following more detailed description of a preferred embodiment, especially when taken in connection with the accompanying drawings, in which.

Figure 1:
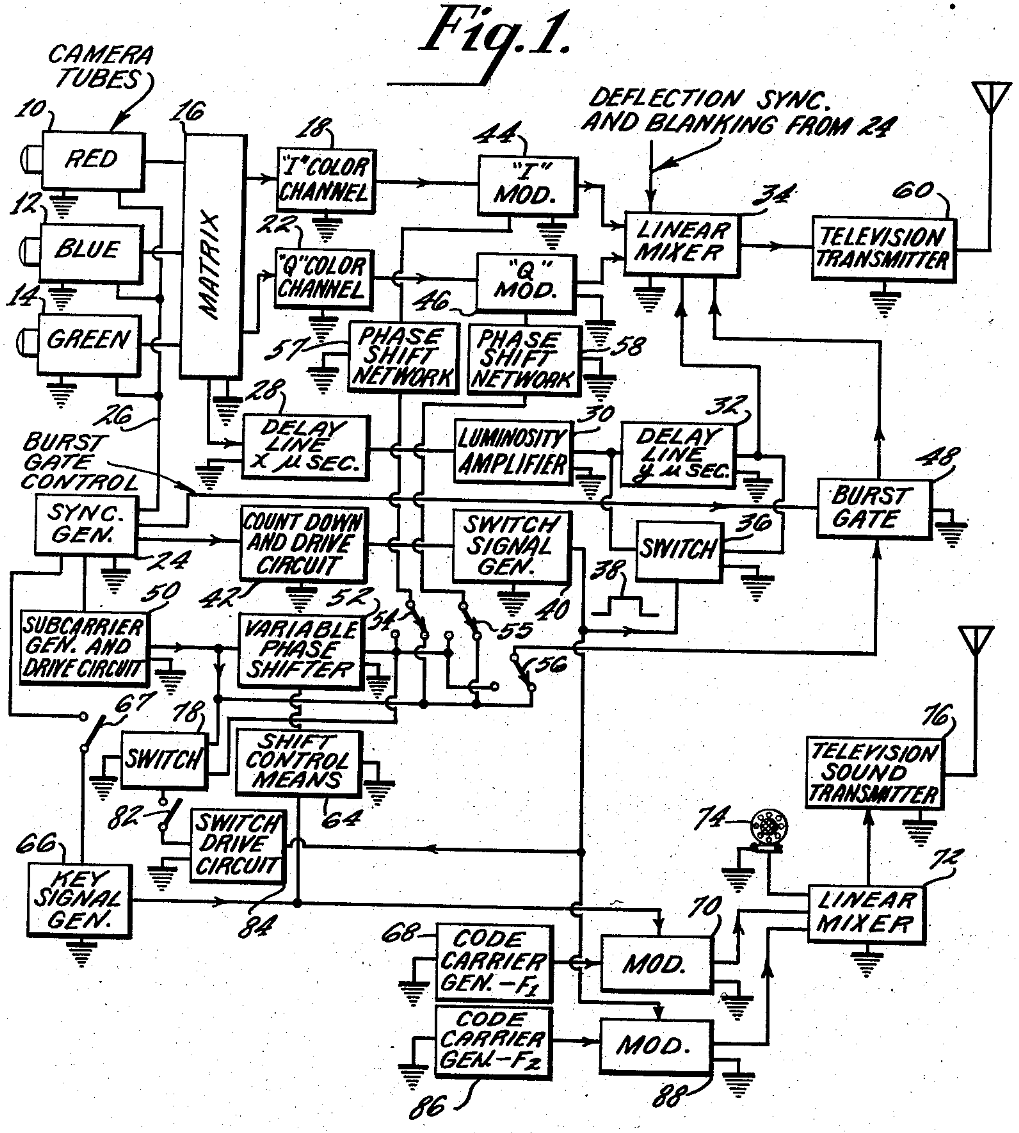
Figure 1 is a block diagram representation of one form of color television signal generating and transmitting circuit embodying the novel features of the present invention.

Turning now to Figure 1, there is illustrated at 10, 12 and 14, television camera tubes of a type useful in obtaining color signals representing the red, blue and green color components of an image. The signals developed by the camera tubes are, in accordance with the above-identified "RCA Review" article, applied to a matrix 16 in which the color signals are combined to produce "I" and "Q" color signal components for application to the "I" and "Q" color channels 18 and 22. The camera pick-up tubes are conventionally controlled by signals derived from a sync generator circuit 24. A typical synchronizing signal generator suitable for use within the block 24 is illustrated by United States Patent No. 2,132,655, to J. P. Smith, entitled "System for Producing Electrical Impulses," issued October 11, 1948. The bus 26 is indicated as carrying so-called camera drive pulses, camera blanking pulses, etc.

In accordance with the above-identified "RCA Review" article, the matrix 16 also provides a luminosity component representative of the brightness values of the scene being televised. This luminosity component is applied to the delay line 28 whose output signal is delivered to the luminosity amplifier 30 of the transmitter. In accordance with the teachings of the above-identified Marshall C. Kidd et al. application, another delay line 32 is provided between the luminosity amplifier 30 and the linear mixer circuit 34. Delay line 32 is conditionally shorted out by the switch 36 which is in turn controlled by the switching waveform 38, as disclosed in the Kidd et al. application. The switching signal 38 is derived from a switch signal generator 40 which is in turn synchronized by a countdown and drive circuit 42 electrically locked to the operation of the sync generator 24. The "I" and "Q" color channels 18 and 22 supply signals to the "I" and "Q" modulators 44 and 46 respectively. In normal operation the "I" and "Q" signals modulate quadrature phase related versions of the color subcarrier having a frequency of 3.58 mc. The so modulated subcarrier signals from the "I" and "Q" modulator circuits are in turn linearly combined with the brightness information or luminance signals delivered by the delay line 32 by means of the linear mixer circuit 34. The color synchronizing "burst" portion of the composite color television signal is supplied by the burst gate 48 which is in turn opened and closed by means of a burst gate control signal derived from the sync generator 24. This burst gate control signal includes pulses periodic in recurrence at the horizontal deflection rate that are timed to permit bursts of color subcarrier signal to be added to the composite television signal during the back porch period of the horizontal sync-blanking waveform.

In accordance with the present invention, the color subcarrier for the "I" and "Q" modulators 44 and 46 as well as the subcarrier applied to the burst gate 48 is derived from a subcarrier generator and drive circuit 50 through a variable phase shifter circuit 52. The signal developed by the subcarrier generator and drive circuit 50 is often referred to as the color carrier or when combined with other signal components as the color subcarrier. The variable phase shifter circuit 52 may be conditionally bypassed by means of the switches 54, 55 and 56 so that the circuit operation with the switches 54, 55 and 56 in the right hand position (as illustrated) is conventional. Subcarrier signal is, under these conditions, applied directly to the phase shift network 57 for the "I" modulator, phase shift network 58 for the "Q" modulator, and directly to the burst gate 48. The phase shift networks apply the desired quadrature related phase aspects of the subcarrier to the "I" and "Q" modulators, properly related in phase to the signal applied to the burst gate 48. The signal transmitted by the television transmitter 60 will then be a color television signal as described in the above-identified "RCA Review" article.

In accordance with the present invention, however, switches 54, 55 and 56 are provided with a plurality of terminals (left hand positions) permitting the output signal from the variable phase shifter 52 to be conditionally applied to the phase shift networks 57 and 58 as well as the burst gate 48 whenever the corresponding one of switch 54, 55 and 56 are moved to the left position. The variable phase shifter circuit 52 may be controlled by a shift control signal responsive to an appropriate form of coding signal whereby to vary the phase of the subcarrier information applied to the "I" and "Q" channels as well as the burst gate during transmission of a television scene. By way of example, there has been illustrated in Figure 1, a shift control means 64 responsive to a key signal generator 66. Operation of the key signal generator 66 may be conditionally locked in with the operation of the sync generator 24 by means of the switch 67, if desired.

The phase shift control signal delivered by the key signal generator 66 is also transmitted over the television sound channel by means of a code carrier signal generated by the code carrier generator 68. The frequency of the code carrier is arbitrarily designated as $F_1$ and may be made supersonic. Modulation of the code carrier $F_1$ by the key signal is accomplished in the modulator 70. The modulated code carrier signal is applied to a linear mixing circuit 72 where it is combined with audio signal from the audio signal source 74. The resultant composite sound channel signal is applied to a television sound transmitter 76 for broadcast to a remote location.

Further in accordance with the present invention, the variable phase shifter circuit 52 may be conditionally bypassed by means of a signal responsive switch 78. Switch 78, in a normally open condition, is rendered operative to conditionally bypass the variable phase shifter circuit 52 through the closing of control switch 82, which applies a drive signal to the switch 78 from the switch drive circuit 84. Operation of the switch drive circuit may be synchronized with signals derived from the sync generator 24, as desired. Such an arrangement is illustrated in Figure 1, where the switch drive circuit 84 derives its actuation signal from the switch signal generator 40 employed to control the previously described switch 36. The code key waveform 38 produced by the switch generator 40 is communicated over the television sound channel through the modulation of a code carrier signal $F_2$ generated by the code carrier generator 86. The modulation of the code carrier $F_2$ is accomplished in the modulator circuit 88, with the resulting modulated signal being applied to the linear mixer 72 for mixing with the composite sound channel signal.

In the operation of the embodiment of the present invention shown in Figure 1, the color subcarrier applied to the "I" color channel modulator, the "Q" color channel modulator or the burst gate 48 may be made to shift in phase (preferably by discrete amounts at random times) during the transmission of a television scene. In one possible arrangement, the key signal generator 66 may be timed by the sync generator 24 to produce changes in the characteristics of the variable phase shifter circuit 52 during alternate fields of a broadcast television signal. Under such conditions, placing switches 54 and 55 concomitantly in their left hand positions and switch 56 in its right hand position will cause the color subcarrier applied to the "I" and "Q" modulators 44 and 46 to shift from one field to the next. Alternatively, switches 54 and 55 may be placed in their right hand positions with switch 56 in its left hand position. With this latter arrangement the burst delivered by the burst gate 48 to the linear mixer 34 will shift in phase from one field to the next in accordance with the key signal delivered by the key signal generator 66.

It is also possible, as will be evident from the arrangement of Figure 1, to cause phase shifting of color subcarrier information as applied only to one or the other of the "I" and "Q" modulator circuits.

It is, moreover, contemplated in the practice of the present invention that as, for example, in the transmission of a recurrently phase shifted burst component, the phase shifting influence of the variable phase shifter circuit 52 be constrained to effectiveness only during alternate fields or frames. To accomplish this the normally open switch 78 may be actuated in accordance with the switch drive signal through the closing of switch 82. This will permit the switch signal 38 to cause shunting of the variable phase shifter circuit 52. If the switch signal 38 is made effective to cause shunting of the phase shifter circuit 52 during alternate fields or frames, it will follow that synchronizing burst components transmitted during the back porch interval will conditionally (i. e., if switch 56 is in the left hand position) receive a shift in phase during alternate field or frame intervals.

Standard color television receiving equipment designed to successfully receive color television signals will produce a rather thoroughly garbled television signal in response to any of the color subcarrier information phase shifting techniques described above. In the case of the shifting of color subcarrier synchronizing burst phase, the unmodified color receiver will suffer serious changes in the phase of the color subcarrier oscillator. It is, moreover, apparent that the effective switching of the elements 54, 55 and 56 at predetermined times during the transmission of a television program will produce even greater complexity in the garbled nature of the transmitted signal. It is also contemplated that the color synchronizing burst, as well as the subcarrier applied to the modulators "I" and "Q," may be simultaneously varied to produce one of the more complex and difficult to recover modes of signal garbling.

As brought out in the above-identified Marshall C. Kidd et al. United States patent application, entitled "Television Systems," Serial No. 380,222, brightness information may be delayed during alternate fields or frame periods by means of switch 36 placed in shunt with the delay line 32. The switch 36 may be operated by means of the switching waveform 38, which waveform may be, as previously described, transmitted over the sound channel via the modulation of code carrier $F_2$. The effect of the alternate application of the delay line 32 in the brightness channel during alternate frames or fields, will, as described in the Kidd, et al. application, produce horizontal jitter of the brightness information. This feature, although forming no part of the present invention, taken in combination with the novel color garbling techniques of the present invention, provides a transmitted signal which is useless to both standard monochrome and color television receivers.

Figure 2:
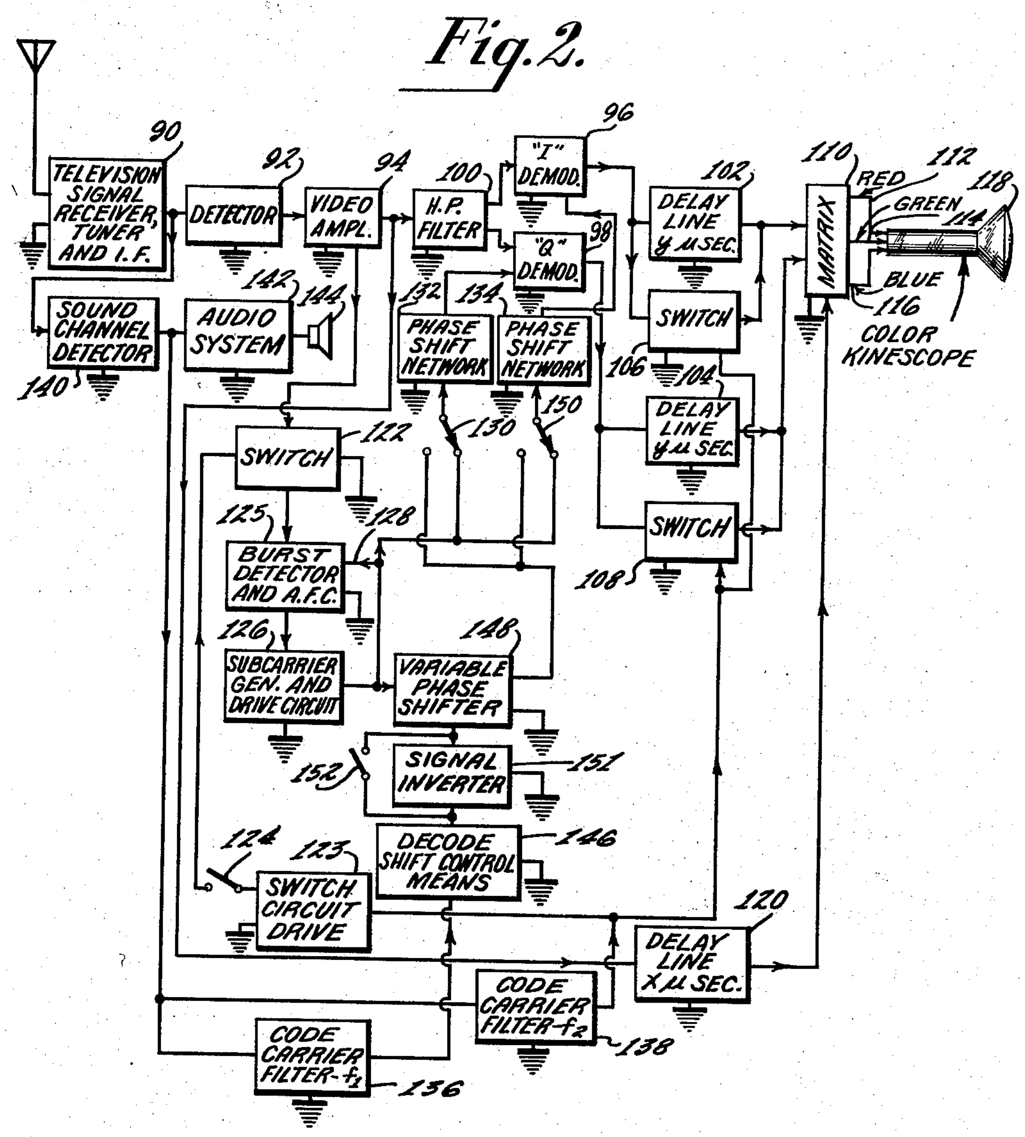
Figure 2 is a block diagram representation of a color television receiving apparatus for utilizing the information and signals provided by the transmitter of Figure 1.

The basic circuit arrangement of Figure 2 is substantially the same as that shown in the above-identified "RCA Review" article. Here a television receiver tuner and I.-F. circuit is shown at 90. Output signal from the intermediate frequency amplifier section of the circuit 90 is applied to a detector circuit 92, whose output signal is in turn applied to a video amplifier 94. The color subcarrier and sideband components are applied to the "I" and "Q" channel demodulators 96 and 98, respectively, through the high-pass filter 100. Delay lines of *y* microseconds as shown at 102 and 104 are conditionally interposed in the "I" and "Q" channels by means of switches 106 and 108 to compensate for the *y* microsecond delay at the transmitter conditionally imposed by the delay line 32 thereof (Figure 1). "I" and "Q" channel information is applied to the matrix 110, which, in accordance with the above "RCA Review" article, normally provides red, green and blue color signals 112, 114 and 116 suitable for application to a color kinescope 118. Brightness channel information for the matrix 110 is applied through the delay line 120 from the output circuit of the video amplifier 94. The *x* microsecond delay of the delay line 120 as well as the corresponding delay line 28 in Figure 1, compensates for the inherent delay in the "I" and "Q" color channels including filter and demodulation action.

Video signal information including the received burst is applied through the normally closed switch 122 to the conventional burst detection and AFC circuit 125. The switch 122 is conditionally operated by means of signal derived from the switch drive circuit 123 conditionally upon the closing of switch 124. The burst detector and AFC circuit 125 operates upon the subcarrier generator and drive circuit 126 so as to maintain the frequency and phase of the subcarrier generator in correspondence with the frequency and phase of the received burst. Comparison signal as required for the AFC portion of block 125 is provided by the circuit path 128. With the switches 130 and 150 in the right hand position (as illustrated), signal from the subcarrier generator is directly applied to conventional phase shift means 132 and 134 which in turn are connected with the "I" and "Q" demodulators 96 and 98 in accordance with usual construction.

In order to recover the code signals, employed at the transmitter to garble the television signal, code carrier filters 136 and 138 are connected with the output circuit of a sound channel detector 140 which receives signal from the intermediate frequency amplifiers of the block 90. A conventional audio system 142 is connected with the output circuit of the sound channel detector and terminates in sound reproducer 144. An electrical representation of the phase shift waveform used to encode the signal at the transmitter is recovered at the output terminal of the code carrier filter $F_1$ so that this signal may be applied in accordance with the present invention to a decode shift control means 146. Signals of this type are known variously in the art as a decode signal, decode key signal or descramble signal. The decode shift control means 146 may be substantially identical in nature to the variable phase shift circuit 52 in Figure 1, except that its function is to provide a phase shift influence on the variable phase shifter 148 which is complementary in nature to that produced by the variable phase shift circuit 52 in Figure 1. Thus, the signal delivered by the subcarrier generator and drive circuit 126 may be conditionally shifted in phase by means of the variable phase shifter 148 and applied via the switches 130 and 150 to the "I" and "Q" demodulator circuits 96 and 98 respectively.

A signal inverter circuit 151 may also be provided on a conditional basis between the variable phase shifter means 148 and the decoded shift control means 146. Switch 152 provides means for bypassing the signal inverter 151 when it is not desired to employ its signal inverting function. The value of such an inverting circuit will become apparent as the specification proceeds. Briefly, its use depends on the particular influence desired on the phase shifter 148 by the shift control means 146. It will be apparent from an understanding of the signal encoding or garbling techniques illustrated in Figure 2, that the required sense of phase shaft control on the subcarrier generator at the receiver will be exactly opposite for the respective transmitter garbling methods of shifting the phase of the subcarrier applied to the color modulators as against shifting the phase of the subcarrier as it is used to define transmitted synchronizing bursts.

In the operation of the receiver in Figure 2, it will be seen that recovery of the garbled color television signal propagated by the transmitter of Figure 1 may be accomplished by means of properly arranging switches 130, 150 and 124. For example, if the transmitter code control switches 54 and 55 are in the right hand positions and switch 56 is in the left hand position, the phase of the transmitted synchronizing burst, as described above, will be shifted in accordance with the signal applied to the shift control means 64. If, however, the receiver switches 130 and 150 are in the left hand position, and the burst detector and AFC circuit 125 is designed to follow the changes in the burst signal phase, perfect picture recovery by the receiver will be made possible.

If, however, it is assumed that the AFC circuit of block 125, in the interest of maximum noise immunity incorporates a time constant circuit of such value that it will not follow exactly the instantaneous changes in burst signal phase, it is possible to invoke the action of switch 78 at the transmitter by closing control switch 82 (Figure 1). If the control signal 38, described above, is effective, by way of example, during alternate line periods, alternate bursts transmitted by the arrangement of Figure 1 will have a phase displacement in accordance with the action of the variable phase shifter 52. If, however, the normally closed switch 122 at the receiver is opened during the period of transmitted bursts bearing abnormal phase displacement, this phase displaced burst will not reach the burst detector and AFC circuit 125. Thus, by closing switch 124 which operates the switch 122 from the switch drive circuit 123, as described above, the burst detector and AFC circuit 125 may be made to effectively ignore the transmitted bursts that have been phase displaced. Under this mode of operation of the receiver, switches 130 and 150 should be in the right hand position. It is noted by way of interest, that under the conditions where the control signal 38 of the transmitter in Figure 1 corresponds to alternate line periods, that the horizontal jitter imposed by the delay line 32 of Figure 1 will be on a line for line basis, instead of on a frame or field basis, as described in the Kidd et al. application.

In the case of color television signal garble produced by the phase shift of subcarrier information supplied to the "I" and "Q" modulators 44 and 46 (in Figure 1) it will follow that correction in the receiver may be made by the operating of switches 130 and 150 in their left hand positions. Horizontal jitter recovery, produced by the delay line 32, in Figure 1, is recovered at the receiver by means of the conditional implementation of delay lines 102 and 104. This implementation is produced by the switches 106 and 108 in response to the code carrier $F_2$ as described in the above-identified Kidd et al. application.

Figure 3:
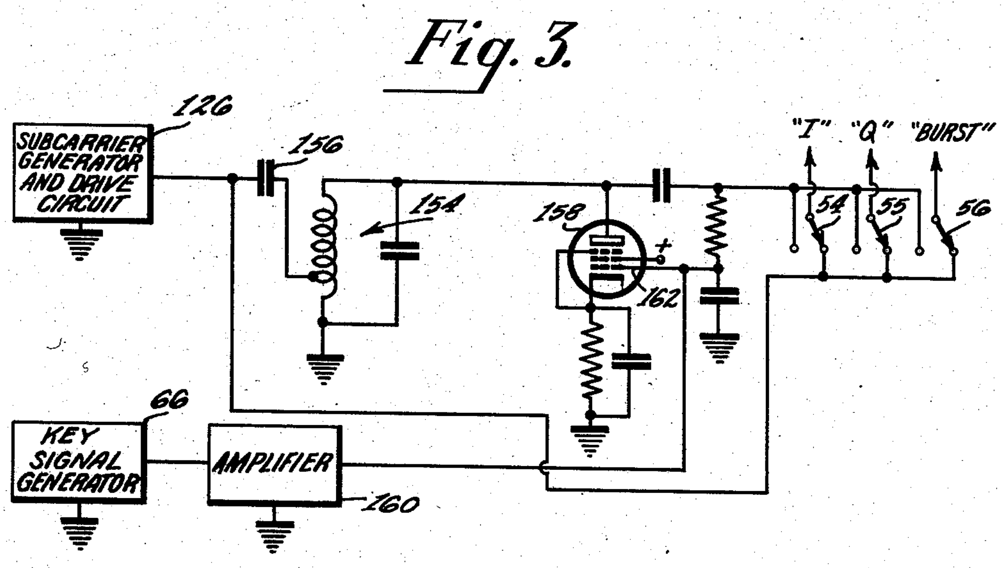
Figure 3 is a combination block and schematic representation of one form of variable phase shifting system for electrical signals, useful in the operation of the present invention.

By way of example of one form of variable phase shifter circuit for use in the present invention, there has been shown in Figure 3 a tuned circuit 154 which is excited by the subcarrier generator and drive circuit 126. The role of the subcarrier generator and drive circuit 126 is the same as that described in the discussion of Figure 2 (or 50 in Figure 1). A capacitor 156 couples energy from the subcarrier generator and drive circuit 126 to a point in the tuned circuit 154. A conventional reactance tube circuit based upon the electron tube 158 is connected in shunt with the tuned circuit 154 so as to provide means for varying the tuning thereof. The key signal generator 66 described above may then be connected through an amplifier such as 160 to the control electrode 162 of the reactance tube 158. In this way the tuning of the resonant circuit 154 may be changed in accordance with coding or decoding signal emanating from the key signal generator. The switch elements 54, 55 and 56 correspond to the elements 54, 55 and 56 of Figure 1 described above. It is apparent that the variable phase shifting means shown in Figure 3 although being illustrated in connection with the environment of Figure 1, may also be applied to the variable phase shifter means 148 in Figure 2.

Figure 4:
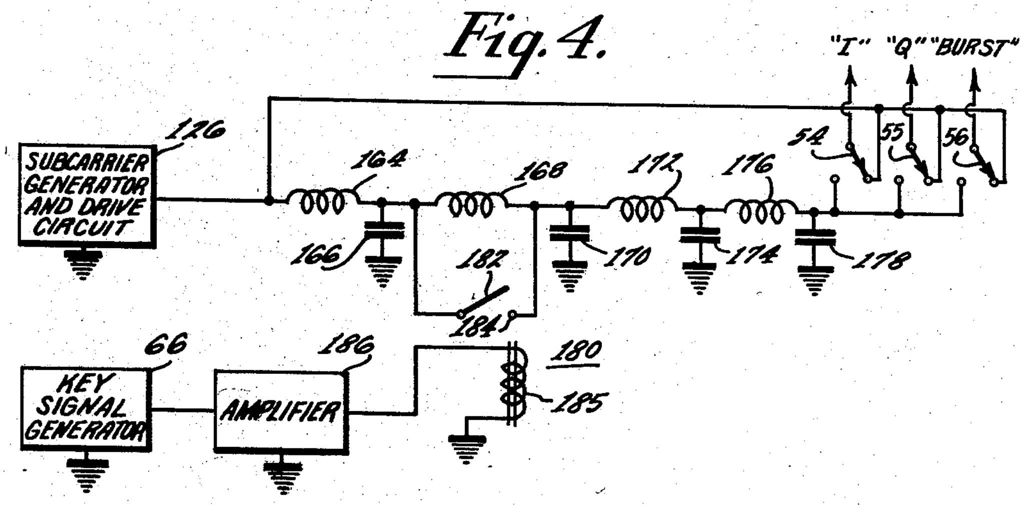
Figure 4 is a combination block and schematic representation of another form of signal delay line for electrical signals useful in the practice of the present invention.

Another form of variable phase shifter is shown in Figure 4, wherein a delay line comprising the elements 164, 166, 168, 170, 172, 174, 176 and 178 is interposed between the subcarrier generator and drive circuit 126 and subcarrier utilization means such as the switches 54, 55 and 56 discussed in connection with Figure 1. In the arrangement of Figure 4, a change in the phase of the subcarrier delivered to the switches 54, 55 and 56 is accomplished by means of the relay 180 having an armature 182 and contact 184 for the control of an external circuit. Actuation of the relay is accomplished by means of the winding 185 which is connected with the output terminal of an amplifier 186. The key signal generator 66 is then connected with the input terminal of the amplifier 186. In this arrangement, the conditional closing of the relay 180 will cause the armature 182 to touch the contact 184, thereby shunting out the inductance element 168. This will effectively reduce the delay imposed by the delay line and will consequently shift the phase of subcarrier signal reaching the switch 54. By means of the switches 54, 55 and 56 the delay line may be conditionally bypassed or connected with either the color modulator or demodulator circuits of a color television subscriber system.

I claim:

1. In a subscriber color television system, the combination of: a source of color television chromaticity signal information; a source of color carrier signal; means coupled with said chromaticity signal source for modulating said carrier with said chromaticity signal to produce a resultant signal having a sideband component and a color carrier component; means coupled with said color carrier signal source for producing bursts of color carrier as color synchronizing data representations; linear signal mixing means coupled with said last named means and said modulating means for combining said resultant signal with said bursts of color carrier whereby to produce a composite signal including at least two representations of color carrier signal; a controllable color carrier signal phase shifting means coupled with said source of color carrier for conditionally varying the phase of the color carrier signal representations in said composite signal; a source of garble phase shift control signal; and signal coupling means between said garble signal and said phase shifting means for varying the phase of said color carrier signal representations in accordance with said garble signal.

2. A subscriber television system according to claim 1, wherein there is included in said system a source of television scene scanning synchronizing signal having a vertical and a horizontal scanning component and wherein said source of garble phase shift control signal includes a signal generator coupled to said source of scanning deflection signal and synchronously related in operation to said vertical scanning component.

3. A subscriber television system according to claim 1, wherein there is additionally provided a television sound accompaniment channel and wherein there is additionally provided means coupled with said source of garble phase shift signal for transmitting decoding signals over said sound accompaniment channel.

4. In a subscription type color television system, the combination of: a source of color intelligence signals representing color television scene information; a source of color carrier signal coupled with said color intelligence signal source so as to maintain said carrier signal in a predetermined timing relation to predetermined components of said color intelligence signals; means coupled with said color intelligence signal source and said carrier signal source for combining said carrier signal with at least a portion of said color intelligence signals; a source of key signal representing a mode of signal garble for said subscription television system; and phase modulation means coupled with said carrier signal source and said key signal source to conditionally alter the phase of carrier signal as it is combined with said color intelligence signals.

5. A subscription color television system according to claim 4, wherein additional means are provided connected with said source of key signal for timing said key signal in accordance with predetermined components of said television signal.

6. In a subscription type color television system, the combination of: a source of color intelligence signals representing color television scene information; a source of color carrier signal coupled with said color intelligence signal source so as to maintain said carrier signal in a predeterminative timing relation to predetermined components of said color intelligence signals; combining means coupled with said television signal source and said carrier signal source for mixing said television signal with an electrical representation of said carrier signal; a source of key signal representing a mode of signal garble for said subscription television system; and phase shifting means electrically coupled with said combining means and said key signal source to conditionally alter the phase of carrier representations mixed with said television signal.

7. In a subscription television receiving system of the type designated to receive and decode garbled color television signal having a multiplex carrier component through the medium of which color hue information is represented, said multiplex carrier component being conditionally phase modulated in accordance with a picture scrambling phase shift pattern, the combination of: means for receiving and delivering demodulated color television signal; a signal generator circuit coupled with said last named means for developing a local subcarrier of a frequency corresponding to said multiplex carrier component; color channel signal demodulation means coupled with said receiving means and said signal generator circuit for demodulating color signal information from said color television signal; signal reproducing means coupled with said last named means for reproducing said color signal information; controllable variable phase shifting means coupled between said signal generator and said color channel signal demodulation means so as to conditionally alter the phase of local subcarrier signal applied to said color channel demodulation means; and a source of key decoding signal coupled with said last named means to shift the phase of said local subcarrier in a manner complementary to said picture scrambling phase shift pattern.

8. A subscription television receiving system according to claim 7, wherein said receiving system includes a television sound accompaniment channel receiving means and wherein said source of decoding signal comprises means responsive to signal intelligence received on said sound channel receiving means.

9. In a subscriber color television transmission system, the combination of: a source of color television chromaticity signals having output terminals respectively presenting a different one of two orthogonal signal components corresponding to first and second chromaticity channel signals; a first and second modulating means connected with said chromaticity signal source for respectively accepting as modulation signals said first and second chromaticity channel signals; a source of color subcarrier signal; controllable phase shift means coupled with said subcarrier signal source; signal coupling means between said phase shift means and only one of said modulating means; signal coupling means from the other modulating means to said subcarrier signal source; a source of garble signal coupled with said phase shift means for shifting the phase of color subcarrier signal as applied to one of said modulating means during transmission of color television; and means for transmitting a version of said garble signal to a receiving location concomitantly with its action on said phase shift means.

10. In a subscription color television receiving system, the combination of: a source of coded multiplexed color television chromaticity signals representing first and second orthogonal color signal components; a source of multiplex demodulating carrier signal; a first and second demodulating means connected with said multiplexed television signal source; controllable phase shift means connected between said multiplex demodulating signal source and at least one of said demodulating means; a signal coupling means from the other demodulating means to said multiplex demodulating signal source and a source of decoding signal coupled with said phase shift means for conditionally shifting the phase of multiplex demodulating signal in a manner complementary to the coding mode of said multiplexed color television chromaticity signal.

11. In a subscriber color television transmission system, the combination of: a source of multiplexed color television chromaticity signals including a color carrier component; a source of burst synchronizing signal corresponding in frequency and phase to said color carrier component of said multiplexed signals; a linear signal mixing circuit coupled with said signal sources for combining said burst signal with said chromaticity signals; a controllable phase shifting means connected in circuit with said coupling between said mixing circuit and said burst signal source; a signal transmitting circuit connected with said mixing circuit; and a source of secret coding signal connected with said phase shifting means for controlling the phase of said burst signal during transmission thereof.

12. In a subscriber color television receiving system, the combination of: a source of coded multiplexed color television chromaticity signals representing first and second orthogonal color signal components and including a synchronizing burst component coded by phase modulation; a source of multiplex demodulating signal; means coupled with and responsive to said coded multiplexed color television signal source burst component and coupled with said multiplex demodulating signal source for controlling the frequency of said latter demodulated signal source by said burst component; signal demodulating means connected with said multiplexed television signal source; controllable phase shift means connected between said multiplex demodulating signal source and said demodulating means; picture reproducing means connected with said demodulating means; and a source of decoding signal coupled with said phase shift means for conditionally shifting the phase of multiplex demodulation signal in a manner complementary to the coding mode of said burst component.

13. In a subscription color television receiver for receiving, demodulating and transducing a coded color television signal into a visible image having entertainment value, said coded television signal comprising a scanning synchronizing control representation and a plurality of discrete image defining components including, a color carrier component phase and amplitude modulated by chrominance information, a chrominance demodulation synchronizing signal component for controlling synchronous demodulation of said chrominance component in said receiver, and a luminance signal component representing monochrome brightness information, said television signal having been coded by imposing changing electrical delay on at least predetermined portions of at least one of said components with respect to at least one other portion of any of said components, said changing delay being in accordance with a secret coding schedule, the combination of: means for separating said scanning synchronizing control representation from said image defining components and said image defining components from each other upon reception by said receiver of a color television signal of the type described; means operatively coupled with said separating means and responsive to said chrominance demodulation synchronizing signal for developing a chrominance demodulation signal; means operatively coupled with said separating means and said demodulation signal developing means responsive to image defining components and developed chrominance demodulation signal for producing demodulated color signals; means operatively coupled with said demodulated color signal producing means and said separating means for producing a visible color image; means producing a decoding control signal representing the character of said secret coding schedule; and controllable signal delay means operatively coupled with said last named means and said separating means and responsive to said decoding control signal for imposing changeable electrical delay on those portions of said signal components required to re-establish phase coincidence between portions of said components affected by said secret coding schedule, whereby a predetermined phase relationship between said scanning synchronizing component and all image defining components are represented in said visible color image.

14. In a subscriber color television receiving system for receiving, demodulating and decoding a standard color television signal which has been coded in accordance with a secrecy schedule, the standard television signal being represented by a first and a second multiplexed group of regularly interlaced signal frequencies, said first group representing luminance and scanning information while said second group represents chrominance and color demodulation synchronizing information, said coding being effectuated by imposing a changing electrical delay upon selected components of said second group of signal frequencies in accordance with said schedule, to produce color distortion in the color television information represented by said color television signal, the combination of: means for receiving a coded television signal of the type described; frequency selective means coupled with said receiving means for separating the signal information represented by said first and second groups of signal frequencies; signal responsive controllable delay means operatively connected with said receiving means for delaying selected components of those signals falling in said second group with respect to other components falling in said second group; a source of decoding signal depicting the character of said secrecy schedule; and means operatively coupling said decoding signal to said signal delay means for actuating said delay means in a manner complementary to said coding secrecy schedule whereby the phase relation of all components in the received coded color television signals are corrected to eliminate said color distortion.

15. In a subscriber television receiver system, the combination of: a source of television signals including video information representations and synchronizing information representations, said synchronizing information representations comprising first components properly timed for use in television image reproduction and second components coded in time and improper for use in television image reproduction, said second components being of the same general character as said first components; means responsive to said television signals and including circuit elements that when properly timed produce a television image; means included in said image producing means and selectively responsive to said synchronizing information for timing said circuit elements of said image producing means, said timing means being inherently responsive to both the first and second components of said synchronizing signal representations so that said second synchronizing components tend to garble television image reproduction; a source of decoding signal depicting the times during which said second synchronizing components occur in said television signal; and means responsive to said decoding signal and coupled with said timing means for conditioning said timing means for nonresponse to said second synchronizing components during their occurrence.

References Cited in the file of this patent

UNITED STATES PATENTS

| | | |
|---|---|---|
| 2,521,010 | Homrighous | Sept. 5, 1950 |
| 2,547,598 | Roschke | Apr. 3, 1951 |
| 2,636,936 | Goldsmith | Apr. 28, 1953 |
| 2,766,321 | Parker | Oct. 9, 1956 |

OTHER REFERENCES

"Electronics" magazine for February 1952, pages 88–97. Copy in Library.